United States Patent [19]
Trimble et al.

[11] 3,788,132
[45] Jan. 29, 1974

[54] TORQUE WRENCH

[75] Inventors: Lester B. Trimble, Downey;
Zygmunt J. Sopinski, Pico Rivera, both of Calif.

[73] Assignee: Jo-Line Tools, Inc., Anaheim, Calif.

[22] Filed: Mar. 10, 1972

[21] Appl. No.: 233,577

[52] U.S. Cl. ............................................... 72/139
[51] Int. Cl. ............................................. G01l 5/24
[58] Field of Search ......... 73/139; 116/129 K, 136.5

[56] References Cited
UNITED STATES PATENTS
1,635,479   7/1927   Hutchinson ...................... 116/129 K
1,646,819   10/1927  Hutchinson ...................... 116/129 K FOREIGN PATENTS OR APPLICATIONS
995,105   8/1951   France ................................. 73/139

*Primary Examiner*—Charles A. Ruehl
*Attorney, Agent, or Firm*—Francis A. Utecht

[57] ABSTRACT

A torque wrench provided with a scale plate that is calibrated in both inch pounds and foot pounds or in both English and metric calibrations. A pointer extends through a slot formed in the plate and terminates in the same plane as the plate to thereby reduce parallax error in reading the torque indication.

1 Claim, 4 Drawing Figures

PATENTED JAN 29 1974  3,788,132

TORQUE WRENCH

BACKGROUND OF THE INVENTION

1. Field of the Invention

The present invention relates generally to wrenches and more particularly to a new and novel torque wrench.

2. Description of the Prior Art

The usual torque wrench includes a beam having known bending characteristics. A work-engaging head is located at the front of the beam and a hand-hold is located at the rear end of the beam. Near the hand-hold the beam is provided with a scale plate that is marked with torque calibration. A pointer extends rearwardly from the head. The scale plate is located in the same plate as that in which bending of the beam occurs, with the pointer located above the plate so that it can be read by the operator. This arrangement lends itself to errors resulting from parallax.

SUMMARY OF THE INVENTION

The torque wrench of the present invention utilizes a scale plate member which is raised and tilted relative to the longitudinal axis of the beam. The pointer is disposed below the scale plate and its free end projects upwardly through a slot formed in the scale plate member. Torque calibration indicia are imprinted on the scale plate member. With this arrangement, parallax error is minimized when the torque calibrations are read. The scale plate member may be provided with two sets of torque calibration indicia, as for example, both inch pound and foot pound calibrations or both English and metric calibrations.

DESCRIPTION OF PREFERRED EMBODIMENT

Figure 1:
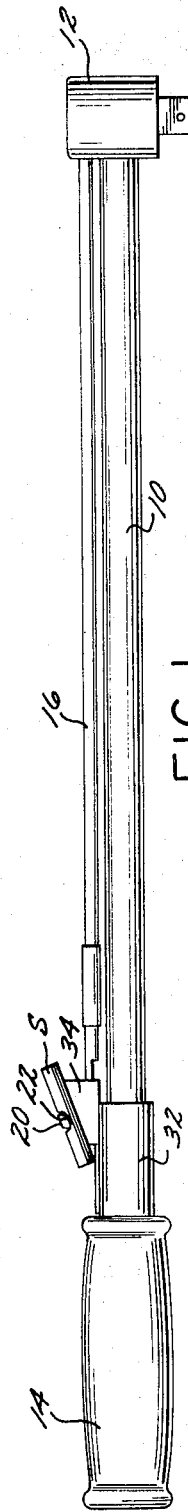
FIG. 1 is a side elevational view showing a preferred form of torque wrench embodying the present invention.
Figure 2:
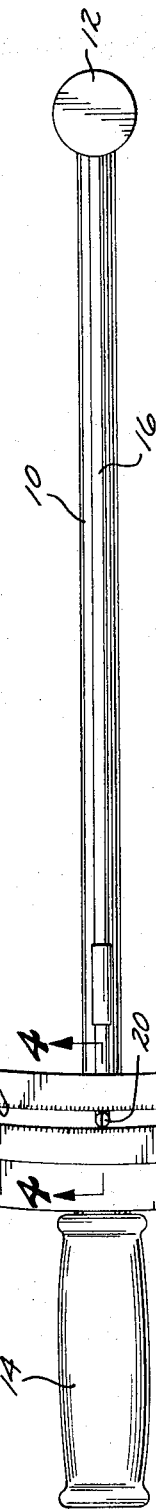
FIG. 2 is a top plan view of said torque wrench.

Referring to the drawings, a preferred form of torque wrench embodying the present invention includes a cylindrical beam 10 having a work-engaging head 12 at its front end and a hand-hold 14 at its rear end. A pointer rod 16 extends rearwardly from the head 12 parallel with and above the beam 10. A scale plate member S is secured to the rear portion of beam 10. Pointer rod 16 cooperates with a scale plate member S to provide an indication of the torque being applied by the torque wrench. Thus, when head 12 is engaged with a bolt, nut or the like (not shown) a user grasps hand-hold 14 to pivot the beam 10 around the axis of rotation of such work. When such work has been tightened, the pointer rod 16 tends to remain fixed upon further pivotal movement of beam 10 whereby the scale plate member S moves relative to the pointer rod in an amount proportional to the amount of torque being applied to the work.

The aforedescribed arrangement is generally similar to conventional torque-indicating wrenches of the manually-operated type. An exception, however, is the provision of a scale plate member S that is raised above the beam 10, with the rear end of the pointer rod 16 being formed with the readout finger 20 that extends upwardly through a transversely extending slot 22 formed in scale plate member S.

Figure 3:
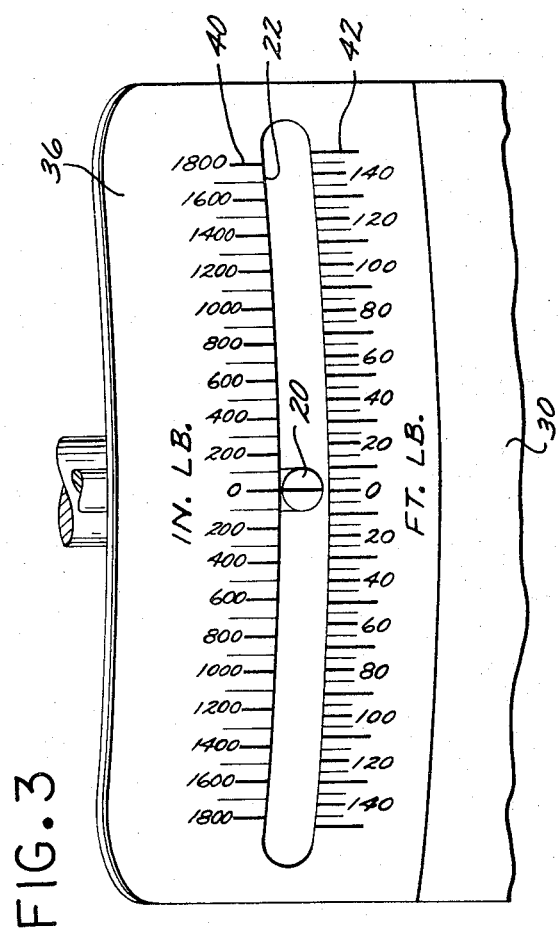
FIG. 3 is a fragmentary enlarged view of the scale plate member of said torque wrench.

More particularly, scale plate member S includes a flat base 30 having its underside affixed to a collar 32 secured upon the rear portion of beam 10. The sides of the base 30 are formed with a pair of integral ears 34. An indicia plate 36 is rigidly supported between the ears 34, with slot 22 being formed across indicia plate 36. Indicia plate 36 is tilted upwardly and forwardly relative to the rear of the torque wrench. Preferably, two sets of calibration indicia will be imprinted upon the upper face of indicia plate 36. Referring particularly to FIG. 3, by way of example, inch pound indicia 40 and foot pound indicia 42 may be imprinted upon indicia plate 36. Alternatively, both English and metric calibration indicia may be utilized.

Figure 4:
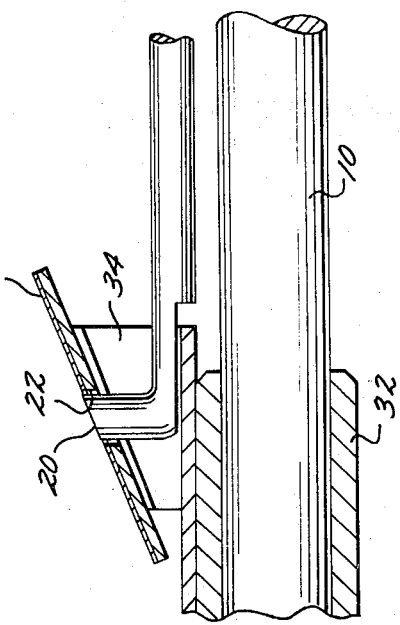
FIG. 4 is a vertical sectional view taken in enlarged scale along line 4—4 of FIG. 2.

Referring now to FIG. 4, it should be noted that the upper end of read-out finger 20 is disposed at substantially the same angle as indicia plate 36 and the upper end of such finger is in the same plane as the upper surface of indicia plate 36. With this arrangement, the torque indication is easily read by the torque wrench user and yet the possibility of parallax error when the indicia 40 or 42 is read is minimized.

Various modifications and changes may be made with respect to the foregoing detailed description without departing from the spirit of the present invention.

We claim:

1. A torque wrench comprising:

a beam;

a work-engaging head on the front end of said beam;

a scale plate member secured to the rear portion of said beam and having an indicia plate that is tilted upwardly and forwardly relative to the rear of said beam, said indicia plate being formed with a transversely extending slot;

two sets of torque calibration indicia imprinted upon said indicia plate, one of said torque calibration indicia being positioned along the upper edge of said slot and the other of said torque calibration indicia being positioned along the lower edge of said slot; and a pointer rod extending rearwardly from said head above said beam and having a read-out finger at its rear portion, with the upper end of said read-out finger being disposed substantially at the same angle and in the same plane as said indicia plate.

* * * * *